DOUBLE SIGNAL TO NOISE RATIO IN A SEARCH MEMORY

Filed April 23, 1963 2 Sheets-Sheet 1

INVENTORS
GEORGE A. FEDDE
CHARLES A. NELSON
BY David Teschner
ATTORNEY

United States Patent Office 3,316,542
Patented Apr. 25, 1967

3,316,542

DOUBLE SIGNAL TO NOISE RATIO IN A SEARCH MEMORY

George A. Fedde, Norristown, and Charles A. Nelson, Philadelphia, Pa., assignors to Sperry Rand Corporation, New York, N.Y., a corporation of Delaware
Filed Apr. 23, 1963, Ser. No. 275,106
17 Claims. (Cl. 340—174)

This invention relates to a thin film search memory, and more particularly, to a method by which the output level of such a search memory is increased to provide output signals distinguishable from attendant noise over its entire range of operation.

The search memory is a unique type of device wherein information located within it is found by means of a comparison between the stored information and an incoming search word. The comparison may be made between the entire information word or a smaller portion generally known as a tag. The search memory differs from the usual addressable memory in that there is no provision for addressing specific locations and reading out the information stored therein regardless of its significance. Because of the comparison characteristic operation of the search memory, it may be used to locate information within the memory without knowing the specific location where it may be stored. For example, incoming information may be checked to see whether or not the receiving data processing system is interested in the particular information, in other words, is this information which the data processor is arranged to respond to. In look-up devices, a search memory can tell whether or not the search information is something which the device is arranged to handle and thus respond only when proper provisions have been made to receive and act upon this information. For example, in a gunnery computer, information regarding targets might be directed to a computer having such a search memory; the search memory could easily determine whether or not this information pertains to a particular target which the computer is tracking. Further, in languade translation it might be possible to use such a search memory to determine whether an equivalent has been stored for a particular incoming word or phrase. In library-type information machines, a search memory might be used to determine whether or not particular subject matter which is desired may be found within the computer. Further, a search memory may be used to determine whether or not an overall program of routine is found within the computer storage. In this instance, a search word which corresponds to the first step or some identifying portion of the instruction might be fed into the machine to determine if it can be found. The presence of the routine would be determined by this correspondence and the remaining portions of the instruction read out in a sequential manner under the direction of some other portion of the computer.

In a usual search memory device, the individual storage units used to store bits of the unit are made with provision for non-destructive readout. Such non-destructive readout permits the storage of a particular bit of information whether it be a "1" or a "0" and a later sensing of this stored information without destroying the significant stored value. A good example of such a memory unit is the bi-core memory unit of the Arthur V. Pohm et al. Patent No. 3,015,807. The bi-core unit is made up of a first bi-stable magnetic member termed a memory element and it is used to store information depending upon in which of its two magnetic stable states it has been placed. A second magnetic element, also bi-stable, termed the readout core is placed in close proximity to the memory element. Upon receipt of incoming search signals, the magnetization vector of the readout core may be changed to produce a signal indicative of the relative conditions of the incoming search signal and the value stored in the memory element. In the usual case, if the information stored within a memory element and that sought for by the incoming search signal are different, a signal will be generated which will show the dissimilarity. However, if there is agreement between the incoming search signal and the information which is stored within the memory, no signal will be generated.

The usual grouping of information within a search memory is the word, composed of a number of discrete bits. Each of the bits comprising a word is stored in a separate magnetic memory unit. The memory unit storing a particular word are controlled by an associated drive line which is used to disturb their stable condition, such a line being known as a word line and as the name implies, will connect all the memory units of a particular word. A further drive line designated the bit selection line is employed to connect all of the bits of the respective words which have the same significance. For example, if we consider the 4th bit of each word in the memory, a bit selection line will connect all of these bits in each of the words in the memory. The incoming search word is set up on all the bit selection lines of the memory. All corresponding bits of the search word then cause actuation signals to be applied to each of the respective bit lines. A further word source is employed to actuate all the word lines simultaneously to provide a portion of the drive current required for sensing the information stored within the individual storage units.

A separate sense line further threads all of the bit storage units in each respective word organization so as to produce a composite signal whose magnitude is determined by the total number of comparisons or lack of comparisons in the word itself. It should be recalled that an output signal is produced by each memory unit if a dissimilarity exists between the stored bit and the search bit, whereas no output is produced if agreement exists. For example, considering a ten-bit word wherein there are five positions of non-comparison between a search word and a word stored, there will be a signal available which is five times the amplitude which may be produced by a single unit, when one dissimilarity exists between bits stored and the search bits. The amplitude of this final sensed signal will thus depend upon the number of positions in which such comparison or lack of comparison have existed. Thus, as in the example above, the five unit signal will indicate that five dissimilarities have existed between the search word and the stored word. In those cases in which there are a large number of dissimilarities between the word stored and the search word, there is no problem as to the amplitude of the output signal which is available. The large number of dissimilarities will ensure that a large amplitude output signal will be detected at the sense winding to indicate the lack of comparison. However, as the number of positions of disagreement between the incoming search word and a stored word decrease, the attendant output signal is also decreased giving rise to certain output signal detection problems. These problems are due mostly to the presence of ambient noise within the system itself. This noise is generally generated by the drive elements employed for the various bit and word lines and also by the associated readout circuitry and amplifiers. Despite the best possible construction of these devices some noise will generally be present within the search memory itself. An approximation of this noise value would be that the value of the noise present within the memory at all times would be equal to the output signal produced by a single memory unit when the stored information and the incoming information are dissimilar. In most instances, this noise may be eliminated by proper level discriminators which would however also eliminate desired output signals in this same range. Thus, in the instance where a long word, stored within the memory, disagrees with an incoming search word by a single bit position, the use of such a noise discriminator would also cause the output normally generated by this dissimilarity to be lost and thus to indicate erroneously that agreement has been found. On the other hand, if the noise is not eliminated an erroneous error signal can be generated even when there is full agreement, since the noise signal level equals the output signal which results from a single dissimilarity.

The embodiments of the present device provide systems by which the amplitude of the output signal available from the search memory may be increased so as to provide a definitive indication of disagreement between only a pair of single bit positions. This increase in amplitude of the sense signal is sufficient to overcome the effects of noise found within the system and still produce a correct result. In a first embodiment, the device sums an additional special character position along with the remaining positions in a storage word so that the signal output is at least increased by one unit. This special character may be the bit normally known as the parity bti often stored within the memory itself. This parity bit is a bit which may take on a value of one or zero depending upon the particular parity system employed. For example, if it is assumed that an odd parity is to be used and there is a total number of one bits in a particular storage word which is even, then the parity bit "one" is inserted so that the total physical count of all ones present in the word is made odd. If the count had been odd originally, the parity bit would have been made zero in order that the total count remain odd. Thus, in the instance where there is one point of disagreement between the entire word stored and the word sought for, the parity bit must be also dissimilar. Hence, if the parity bit position is added to the remaining positions of the word and a one bit position disagreement would occur, the output signal available would be at least two units in amplitude and would be in excess of that normally required to produce an output if noise discriminator circuitry is employed in the device. The parity position will be operative under other conditions in which there are greater numbers of mismatches, but its unique utility will be less significant. This is due to the fact that the output normally available from a multiple number of dissimilarities is sufficient to overcome the effects of the noise discriminating circuit anyway.

In a further embodiment of the device, the output of this additional special position or parity is buffered with the output available from the remaining portions of the search word. In this arrangement, if there is a single position in disagreement and noise is present, the noise may attenuate the value of the output of the search portion of the memory. The noise, however, will have a very small effect upon the signal output of the single parity position due to the extremely short sense line and decreased coupling to drive units. Thus, under these conditions, the output read at the output of the buffer will be due to the one unit output of the parity position which will be strong enough to overcome the effects of the noise. In those situations in which there are two or more discrepancies between the stored word and the search word, the output from the storage portion will be sufficient to override the effects of the noise and produce a large amplitude output signal which will be sufficient to distinguish the lack of agreement between the stored word and the search word.

It is therefore an object of this invention to provide an improved form of search memory.

It is a further object of this invention to provide a search memory with increased signal-to-noise ratio readout.

It is another object of this invention to provide a search memory which employs a parity bit or other special character to increase the signal to noise ratio of the search memory.

Other objects and features of the invention will be pointed out in the following description and claims and illustrated in the accompanying drawings, which disclose by way of example, the principle of the invention, and the best mode which has been contemplated for carrying it out.

In the drawings.

Similar elements are given similar reference characters in each of the respective drawings.

Figure 1:
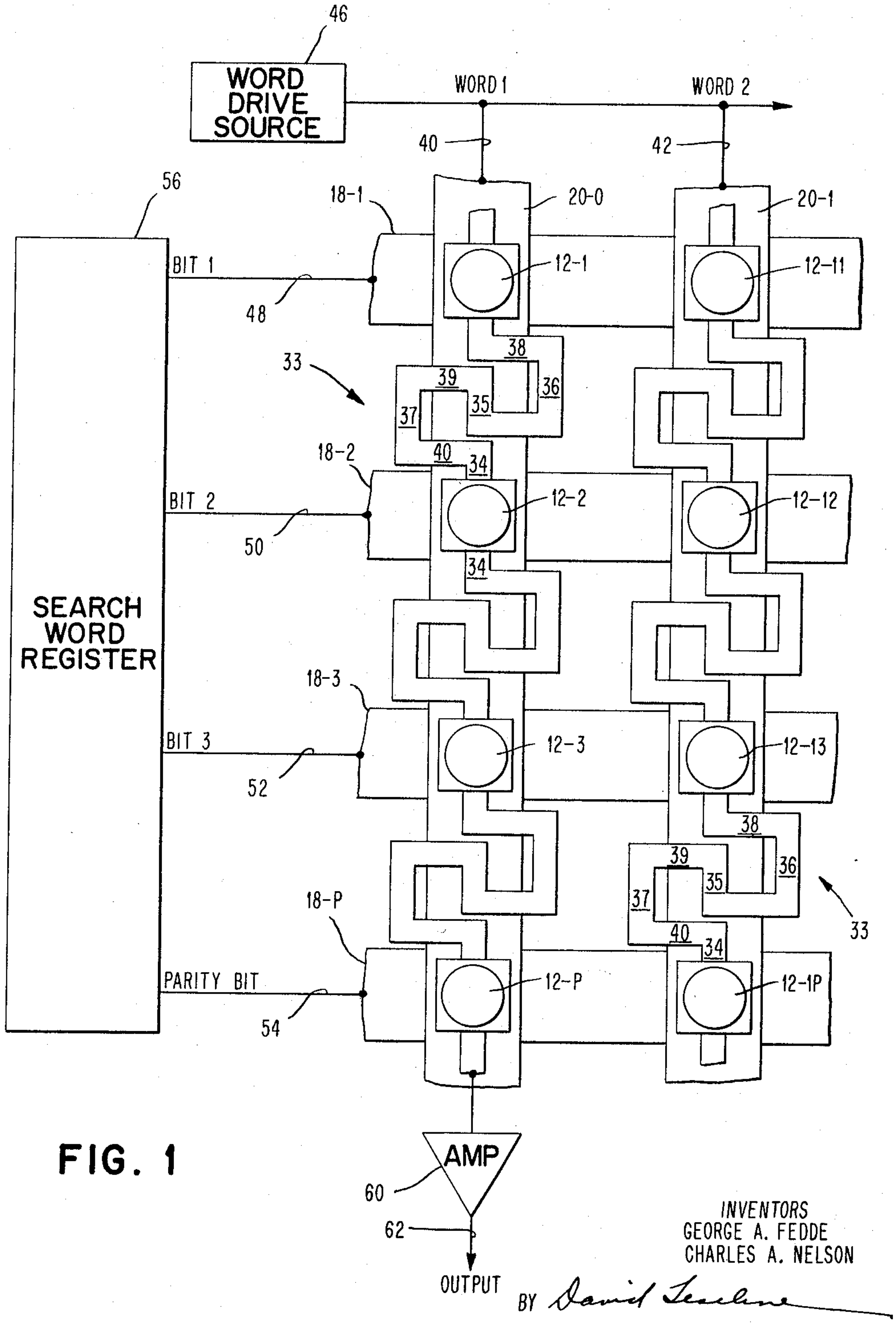
FIGURE 1 illustrates a first embodiment of a search memory constructed in accordance with the basic concepts of this invention.

Referring now to FIGURE 1, there is shown a search memory matrix of bi-core memory units ararnged in rows and columns and capable of storing information bits in a plurality of word registers. At each intersection of the memory matrix there is located a memory unit which permits the storing of binary information and the subsequent reading out of the stored information without destruction of that information. Each of these memory units has two thin film elements as described above which may be magnetized to one of two stable states. One film element is known as the memory film and the other is known as the read-out film. The materials of these films are so chosen that the read-out film has a lower coercivity than the memory film. As a result of the higher coercivity of the memory film, the read-out film is caused to take on a state of magnetization opposite to that of the memory film, and maintain it. Storage of information is accomplished by setting the memory film to one or the other of its two stable states one state corresponding to the binary one the other to binary zero. Read out is accomplished by testing the change in magnetic state of the read-out film under the influence of the word and bit fields. The value of these fields is insufficient to alter the magnetic state of the memory film. The read-out film, is arranged to produce an output signal as a consequence of the application of proper external field pulses, which under conditions of storage of one type of information will produce large signal outputs and the condition of storage of the other type of information will produce a small signal output. When the external fields applied to the read-out film are removed, the effects of the memory film will be such as to return the read-out film to its original condition, thus preserving the indication of the value stored in the memory film and permitting additional read out at a later time. Memory units of this type are known as bi-core memory units. A storage matrix composed of such bi-core units and briefly described above is disclosed in the copending application 212,310, now Patent No. 3,188,613, filed July 25, 1962 by George A. Fedde, and assigned to the assignee of the instant invention. As described in greater detail in said application, all of the storage locations which constitute a complete word are arranged along a particular drive line defined as a word drive line or simply a word line. When actuated by a proper source connected to said word line, a magnetic field will be produced by current in the drive line. This field is impressed upon the individual storage units such that the remanent magnetization state of the read-out film will be altered from its stable state. The word lines are indicated in FIGURE 1 as the lines 20-0, and 20-1, and for the respective words 1, 2. The word lines are connected by lines 40, and 42, respectively to a source of word drive current 46. The word drive source may take any convenient form suitable to produce drive current to cause the desired rotation or altering of the magnetic state of the read film without altering the memory film. In addition, each of the storage elements along a particular denominational order are connected by similar drive lines known as bit drive lines and indicated in FIGURE 1 as 18–1, 18–2 and 18–3 for the respective positions 1, 2 and 3 of the search word. In addition, there is an additional bit drive ilne 18–p which is connected to all the parity positions of the words stored. The bit lines are in turn connected by means of the lines 48, 50, 52 and 54 respectively to a search word register 56. The search word register may take the form of any well-known register which can receive and store a plurality of bits of information and produce a set of static outputs depending upon the value stored therein. For example, a signal of a first polarity is produced by each bit position of the search word register 56 if a one is stored therein, whereas a second polarity signal is produced if a zero is stored therein. Thus, on the lines 18–1, 18–2, 18–3 and 18–p there will be established currents whose polarities are dependent upon the particular values stored within the respective bit positions of the search word register 56.

As set forth in greater detail in the above-cited co-pending application, the effect of the word drive source is to cause a slight variation of the remanent magnetization of the read-out film of all storage units to a direction parallel with the direction of the word field. The subsequent application of the bit fields from the search word register 56 will cause a further rotation of the remanent magnetization vector. In the event that the value stored at the particular location is the same as the value being sought at that location, the vectors representing the magnetic field of the stored bit and the search bit will be along the same line and cause the remanent magnetization vector position to move from a position caused by the word field to a position again parallel with the original store vector location. This movement will produce a very small valued output signal at the sense line which will be considered to be the match condition signal of zero value. However, in the event that the value stored and the search value are opposite, a large rotation is caused in the remanent magnetization vector position originally established as a result of the application of the word field to the memory units of the memory and a large output signal will be produced upon the sense. This current will indicate that a mismatch condition has existed. When the external fields (that is the word field and the bit field) are removed, the magnetization vector of the read-out film will take up its original position caused by the external field generated by the memory film. In this manner, non-destructive read out of the device is possible.

Each of the bits of a particular word are connected by a common line known as the sense line which is employed to detect the signals produced in the bit positions along the line. Since these signals are conducted by a common line connecting all bit positions of that word, the effects are additive so that a signal applied to the output amplifier 60 for example, with regard to word one, will be the summation of all the signals developed as a result of mismatches along the bit position of word one. As is shown in FIGURE 1, the sense line 22–0 is caused to take a circuitous route in connecting each of the respective bit positions of a word in an effort to minimize the self-inductances found in the line itself and to minimize the pick up of extraneous signals by the line. The output line 62 is provided to conduct the output signal of a sense amplifier 60 to the utilizing device. A signal will be produced upon this line 62 in the event that there is any mismatch condition existing along the entire length of the search word, including the additional parity bit. There will be no signal output at this line 62 in the event that there is complete agreement between all positions of the search word and the stored word, including the parity bits.

As has been described above, each word is stored with a particular digit known as a parity bit included. Thus, when reading the entire word and its parity bit, it is possible with respect to the word alone, to obtain a signal which is one unit greater than that obtainable merely from comparison of the word itself with the incoming search word. The output amplifiers, such as amplifier 60 of this device, are of the threshold type, that is responsive to the amplitude of the input providing a certain minimal amplitude level is met. Increases in the input level in excess of that required to operate the amplifier will not result in increased outputs. Thus, if there is a mismatch of five conditions between the stored word and the search word, the additional output produced by the mismatch of the parity bit will not in any way destroy or alter the normal output result. A signal will be produced to indicate that a mismatch has occurred. The importance of this additional parity position in the summation of the parity and storage locations becomes clear when considering the effects of a single mismatch condition within a word. If there is disagreement between the input information and the stored information, at one position, a one unit signal will be developed. This signal will be the output of the particular storage unit which does not have stored within it the same bit of information as being sought for by the search word. Absent additional noise or other extraneous signals in the device, this one unit signal would be sufficient for recognition purposes to distinguish a mismatch condition from a match condition. However, due to the presence of noise within the circuit due to the driving circuits and other external equipment, it may be assumed that a unit signal will be available due to this noise. The presence of this noise may have one of two effects upon the output signal available from a one mismatch. In a first case, the noise may be of an opposite polarity and cause a cancellation of the output signals from this one value of mismatch. Or on the other hand, the signal may be such that if a detector or discriminator circuit is provided at the output to eliminate this one unit of noise and the noise is not present, the value of the signal produced by the one unit mismatch may possibly be lost by the discriminator action. In either of these instances, it will be impossible then to recognize the condition of a single mismatch. The use of the parity position permits the overcoming of this particular noise problem by increasing the signal to noise ratio so that regardless of the effects of the noise, it will be insufficient to cancel the signal produced or to allow the discriminator to destroy a mismatch signal. Under this particular condition, the parity bit sucessfully adds to the amplitude or doubles the amplitude of the signal normally available from a single position of disagreement.

From a consideration of parity bits and their formation, it is obvious that it is not possible to derive two words from the same number of bit positions which differ by merely a single bit position and which have the same parity bit. Thus, if there is a disagreement between a single bit position within the search word and the stored word, the parity bits must also disagree. For example, in a four-bit word if one word has three ones, its parity must be zero, that is assuming an odd parity, whereas if a second word has merely two ones, its parity must be one. Thus, the words disagree by one position and the parity bits are also dissimilar giving two positions in disagreement when considering the total including the parity. Thus, for this condition, it is assured that there will be a signal which will be in excess of the noise desired. As the number of positions of disagreement increase, the output from the word itself is sufficient to produce a proper registration of dissimilarity and the parity is actually not necessary. However, it is the critical point at which only a single position disagrees that the parity plays its important role.

In long word organizations, a number of parity positions may be included within the word itself. Thus, for instance if an 80 bit word were employed, five or six parities at various intervals may be established for respective portions of the word. This would permit an overcoming of the noise inherently present within the matrix.

Figure 2:
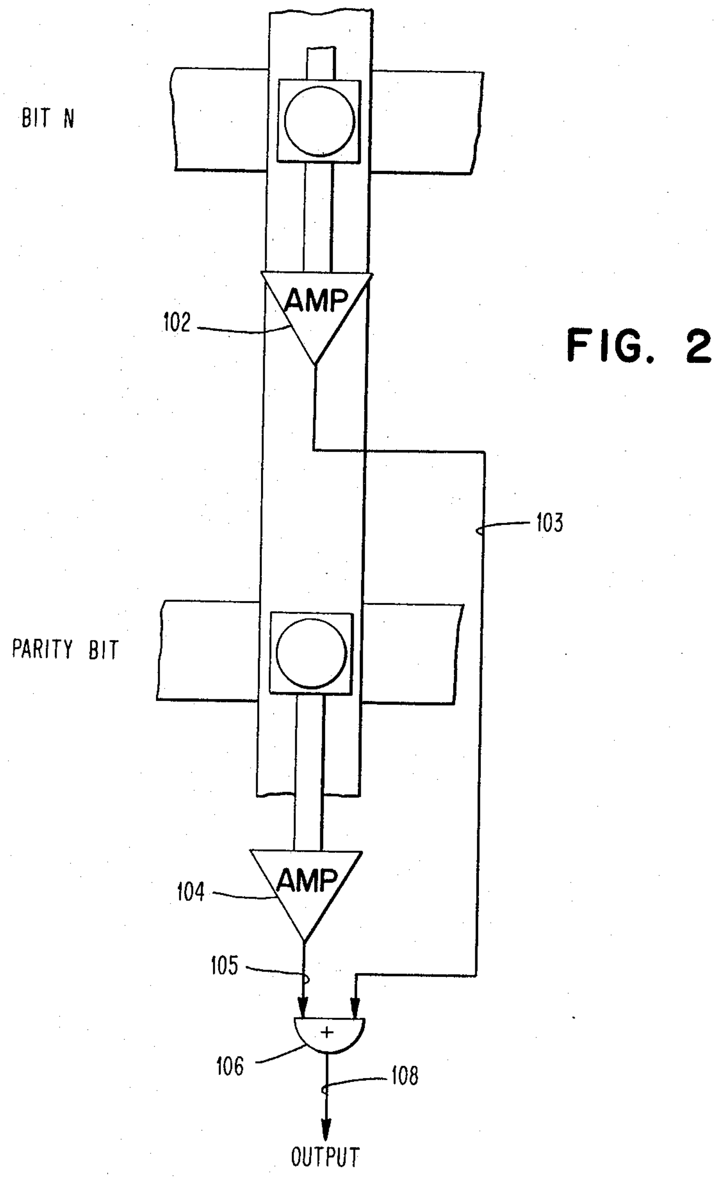
FIGURE 2 illustrates a second embodiment of a search memory constructed in accordance with the basic concepts of this invention.

Turning now to FIGURE 2, there is shown an alternative arrangement of the device of FIGURE 1. In this arrangement, as is seen from FIGURE 2, the output of the various storage locations of the word itself are conducted to a first amplifier 102 whereas the output of the parity position is conducted to a second amplifier 104. The outputs 103 and 105, respectively of the amplifiers 102 and 104 are conducted to a buffer circuit 106 which produces an output signal on line 108. Again assuming the worst possible condition, that is a condition wherein there is only one dissimilarity between the stored and the search word, and there is noise present within the system, the output of the amplifier 102 on the line 103 may be diminished or completely eliminated as a result of opposite polarity noise signals. However, in that the output of the stored parity position would also disagree with the parity of the search word, a signal would also be available on the line 105 from the amplifier 104. This signal would be passed through the buffer 106 to produce an output indicating this dissimilarity. In the event that there is more than one disagreement between the stored and the search words, the output of the amplifier 102 on line 103 would be significantly higher than the output on the line 105 from the amplifier 104. Thus, a signal would be fed through the buffer 106 to the output line 108. The operation of the device of FIGURE 2 may be broadly explained as follows. The memory units of the storage portion of the device are connected to a large number of drive lines, and other memory units, each of which may contribute noise to the output of a single memory unit. In addition, the outputs of the respective units must be conducted over long sense lines which permit the induction of additional noise as well as the attenuation of the output signal level due to the properties of the sense line itself. Thus if only a single unit output is produced, as when a single disagreement exists, this signal may be greatly attenuated or cancelled. The output of the single parity position is not affected by many of these factors. First the parity position is not connected to the remainder of the memory by a common sense line. Thus much of the noise is eliminated. Further the parity position is effectively connected to the search word register by only a single drive line, also reducing the generated noise. In addition, the output of the parity position is fed directly to an amplifier, for example, amplifier 104 via a short sense line preventing to a large degree signal attenuation. Thus the output of the parity position is significantly less effected by noise present in the memory than will be the memory units. Thus under the condition where a single storage position disagreement occurs the output of the storage section may be diminished or even cancelled whereas the output of the parity position would be usable. Thus the buffer device 106 would respond to this parity signal to produce a usable outut on line 108. If more than one disagreement exists the output of amplifier 102, connected to the memory units of the storage section, will be sufficient to operate the buffer 106. Buffer 106 is such as to operate if one of its inputs exceeds a minimum level and will produce the same output regardless of the amplitude of the input signal providing its minimum or threshold level is met.

Although the embodiments of the invention have been described with respect to a particular form of search memory, it should be understood that the principles taught are equally applicable to any other type of non-destructive read out search memory and that one skilled in the art may easily adapt the principles of the invention to such other memories without departing from the scope of the invention.

The embodiments of the invention in which an exclusive property or privilege is claimed are defined as follows:

1. A search memory comprising a plurality of individual storage devices organized into rows and columns for storing information bits and special character bits therein, the devices of each of said columns storing the bits of a complete information unit, and a related special character bit; actuating means including a search means adapted to receive a multi-bit search unit including information bits and a special character bit; connecting means interconnecting all of said bits of said search means to said storage devices; said storage devices producing output signals when properly actuated by means of said actuating means; and output means interconnecting said information bit storage devices and said special character bit storage devices to sum the respective signals produced and produce an output signal whose amplitude is greater than that available from said information bit storage devices alone.

2. A search memory comprising a plurality of individual storage devices organized into rows and columns for storing information bits and special character bits therein, the devices of each of said columns storing the bits of a complete information unit and a related special character bit; actuating means associated with and connected to each column of said memory to apply a first signal to all of said devices in its related column; a search means adapted to receive a multi-bit search unit including information bits and a special character bit; connecting means interconnecting each of the information bits and special character bit of said search means to separate rows of said memory; said storage devices producing output signals when properly actuated by said actuating means and said search means; and a plurality of output means each interconnecting said information bit storage devices and said special character bit storage device to sum the respective signals produced and produce an output signal whose amplitude is greater than that available from said information bit storage devices alone.

3. A device as claimed in claim 2, wherein said storage device is a magnetic core storage element, said actuating means providing a first coordinate selection current and said search means providing the second coordinate selection current required to select and read out the contents of said core.

4. A search memory comprising a plurality of individual storage devices organized into rows and columns for storing information bits and special character bits therein, the devices of each of said columns storing the bits of a complete information unit and a related special character bit; actuating means associated with and connected to each column of said memory, to apply a first signal to all of said devices in its related column; a search means adapted to receive a multi-bit search unit including information bits and a special character bit; connecting means interconnecting each of the information bits and special character bit of said search means to separate rows of said memory; said storage devices producing an output signal when said stored bit and said search bit are dissimilar and producing no output signal when said stored bit and said search bit are similar; and a plurality of output means each interconnecting said information bit storage devices and said special character bit storage device in a column to sum the respective signals produced by said storage devices and provide an output signal whose amplitude is greater than that available from said information bit storage devices alone.

5. A device as claimed in claim 4, wherein said storage devices are thin film storage elements; said actuating means providing unit line drive current and said search means providing bit line drive current.

6. A device as claimed in claim 4, wherein said storage devices are bi-core thin film storage elements with non-destructive read-out capability; said actuating means providing unit line drive current and said search means providing bit line drive current.

7. A search memory comprising a plurality of thin film storage elements organized into rows and columns for storing therein information bits and special character bits, the elements of each column storing the bits of a complete information unit and a related special character bit; a plurality of unit drive lines, one for each column of said memory, and connected to all the information bit elements and the special character bit element which make up the information unit; unit drive source connected to all of said unit drive lines to provide unit drive current to said unit drive lines; a plurality of bit drive lines connecting all the elements of said memory in the same row including said special character bits; a search means adapted to receive a multi-bit search unit including information bits and a special character bit; connecting means to connect the bits of said search unit to the bit drive lines of said memory in the corresponding row; said thin film storage elements further being adapted to produce an output if the value of the bit stored by it is not similar to the value of the bit contained in the corresponding search unit bit position; and a plurality of output sensing means, one for each column and connected to each element of said column, to sense the outputs of the information storage elements and the special character storage element and sum the respective outputs to produce an output signal whose amplitude is greater than that available from said information bit storage elements alone.

8. A search memory comprising a plurality of thin film storage elements each capable of remaining in either of two distinct anti-parallel remanent states, each state representing a distinct binary value, said elements being organized into rows and columns for storing therein information bits and special character bits, the elements of each column storing the bits of a complete information unit and a related special character bit; means for establishing remanent stages in said storage elements in accordance with the information to be stored therein, including said special characters; a plurality of unit drive lines, one for each column of said memory and connected to all the elements which make up each information unit; unit drive source connected to all of said unit drive lines to provide unit drive current to said unit drive lines; a plurality of bit drive lines connecting all the elements of said memory in the same row; a search means adapted to receive a multi-bit search unit including information bits and a special character bit and produce bit currents in accordance with the bits received; connecting means to connect the bits of said search unit to the bit drive lines of said memory in the corresponding row; said thin film storage elements further being adapted to produce an output if the remanent state of said element and the direction o fthe field produced as a result of said bit current applied to its bit drive line are anti-parallel and a plurality of output sensing means, one for each column and connected to each element of said column, to sense the outputs of the information storage elements and the special character storage element and sum the respective outputs to produce an output signal whose amplitude is greater than that available from said bit storage elements alone.

9. A search memory comprising a plurality of individual storage devices organized into rows and columns for storing information bits and special character bits therein, the devices of each of said columns storing the bits of a complete information unit and a related special character bit; actuating means including a search means adapted to receive a multi-bit search unit including information bits and a special character bit; connecting means interconnecting all of said bits of said search means to corresponding rows in said search memory including said special character bit; said actuating means further including a signal source connected to all columns of said search memory; said storage devices producing output signals when properly actuated by means of said actuating means; a plurality of first output means, one for each column, and interconnecting all of the information bit storage devices of a single column, to receive the output signal produced by said information bit storage devices; a plurality of second output means, one for each column and connected to the special character bit storage device to receive the output signal produced by said special character bit storage device; a plurality of buffing means, one for each of said columns and each connected to receive the outputs of said first and second output means in its associated column, to produce an output signal whose amplitude is greater than that available from said information bit storage devices alone.

10. A search memory comprising a plurality of individual storage devices organized into rows and columns for storing information bits and special character bits therein, the devices of each of said columns storing the bits of a complete information unit and a related special character bit; actuating means including a search means adapted to receive a multi-bit search unit including information bits and a special character bit; connecting means interconnecting all of said bits of said search means to corresponding rows of said search memory including said special character bit; said actuating means further including a signal source connected to all of said columns; said storage devices producing output signals when properly actuated by means of said actuating means; a plurality of first output means, one for each column, and interconnecting all of the information bit storage devices of a single column, to receive the output signals produced by said information bit storage devices; a plurality of second output means, one for each column and connected to the special character bit storage device to receive the output signal produced by said special character bit storage device; a plurality of buffing means, one for each of said columns and each connected to receive the outputs of said first and second output means in its associated column to produce an output signal whose amplitude is greater than that available from said information bit storage device alone.

11. A search memory comprising a plurality of individual storage devices organized into rows and columns for storing information bits and special character bits therein, the devices of each of said columns storing the bits of a complete information unit and a related special character bit; actuating means associated with and connected to each column of said memory, to apply a first signal to all of said devices in its related column; a search means adapted to receive a multi-bit search unit including information bits and a special character bit and connected to corresponding rows of said search memory; said storage devices further producing output signals when properly actuated by means of said actuating means and said search means; a plurality of first output means, one for each column, and interconnecting all of the information bit storage devices of a single column, to receive the output signals produced by said information bit storage devices; a plurality of second output means, one for each column and connected to the special character bit storage device to receive the output signal produced by said special character bit storage device; a plurality of summing means, one for each of said columns and each connected to receive the outputs of said first and second output means in its associated column, to produce an output signal whose amplitude is greater than that available from said information bit storage devices alone.

12. A search memory comprising a plurality of individual storage devices organized into rows and columns for storing information bits and special character bits therein, the devices of each of said columns storing the bits of a complete information unit and a related special character bit; actuating means associated with and connected to each column of said memory to apply a first signal to all of said devices in its related column; a search means adapted to receive a multi-bit search unit including information bits and a special character bit and connected to corresponding rows in said search memory; said storage devices further producing output signals when properly actuated by means of said actuating means and said search means; a plurality of first output means, one for each column and interconnecting all of the information bit storage devices of a single column, to receive the output signals produced by said information bit storage devices; a plurality of second output means, one for each column and connected to the special character bit storage device to receive the output signal produced by said special character bit storage device; a plurality of buffing means, one for each of said columns and each connected to receive the outputs of said first and second output means in its associated column to produce an output signal whose amplitude is greater than that available from said information bit storage devices alone.

13. A search memory comprising a plurality of individual storage devices organized into rows and columns for storing information bits and special character bits therein, the devices of each of said columns storing the bits of a complete information unit and a related special character bit; actuting means associated with and connected to each column of said memory, to apply a first signal to all of said devices in its related column; a search means adapted to receive a multibit search unit including information bits and a special character bit and connected to corresponding rows of said search memory; said storage devices further producing output signals when properly actuated by means of said actuating means and said search means; a plurality of first output means, one for each column, and interconnecting all of the information bit storage devices of a single column, to receive the output signals produced by said information bit storage devices; a plurality of second output means, one for each column and connected to the special character bit storage device to receive the output signal produced by said special character bit storage device; a plurality of buffing means, one for each of said columns and each connected to receive the outputs of said first and second output means in its associated column to produce an output signal whose amplitude is at least equal to the amplitude of a signal produced by a single storage device.

14. A search memory comprising a plurality of individual storage devices organized into rows and columns for storing information bits and special character bits therein, the devices of each of said columns storing the bits of a complete information unit and a related special character bit; actuating means associated with and connected to each column of said memory, to apply a first signal to all of said devices in its related column; a search means adapted to receive a multi-bit search unit including information bits and a special character bit; connecting means interconnecting each of the information bits and special character bit of said search means to corresponding rows of said memory; said storage devices producing an output signal when said stored bit and said search bit are dissimilar and producing no output signal when said stored bit and said search bit are similar; a plurality of first output means, one for each column, and interconnecting all of the information bit storage devices of a single column, to receive the output signals produced by said information bit storage devices and furnish an output signal proportional to the number of dissimilarities which exist in the respective column; a plurality of second output means, one for each column, and connected to said special character bit storage device to receive the output signals produced by said special character bit storage device and furnish an output signal which may be proportional to the output signal produced by a single storage device; a plurality of buffing means, one for each of said columns and each connected to receive the outputs of said first and second output means and its associated column to produce an output signal whose amplitude is greater than that available from said information bit storage devices above.

15. A search memory comprising a plurality of individual storage devices organized into rows and columns for storing information bits and special character bits therein, the devices of each of said columns storing the bits of a complete information unit and a related special character bit; actuating means associated with and connected to each column of said memory, to apply a first signal to all of said devices in its related column; a search means adapted to receive a multi-bit search unit including information bits and a special character bit; connecting means interconnecting each of the information bits and special character bit of said search means to corresponding rows of said memory; said storage devices producing an output signal when said stored bit and said search bit are dissimilar and producing no output signal when said stored bit and said search bit are similar, a plurality of first output means, one for each column, and interconnecting all of the information bit storage devices of a single column, to receive the output signals produced by said information bit storage devices and furnish an output signal proportional to the number of dissimilarities which exist in the respective column; a plurality of second output means, one for each column, and connected to said special character bit storage device to receive the output signals produced by said special character bit storage device and furnish an output signal which may be proportional to the output signal produced by a single storage device; a plurality of buffing means, one for each of said columns and each connected to receive the outputs of said first and second output means and its associated column to produce an output signal whose amplitude is at least equal to that available from a single information bit storage device.

16. A device as claimed in claim 15, wherein said storage devices are thin film storage elements, said actuating means providing unit line drive current and said search means providing bit line drive current.

17. A device as claimed in claim 15, wherein said storage devices are bi-core thin film storage elements with non-destructive readout capability, said actuating means providing unit line drive current and said search means providing bit line drive current.

References Cited by the Examiner

UNITED STATES PATENTS

| | | | |
|---|---|---|---|
| 3,179,928 | 4/1965 | Sorensen | 340—174 |
| 3,193,806 | 7/1965 | Pohm | 340—174 |
| 3,222,645 | 12/1965 | Davis | 340—146.2 |

BERNARD KONICK, *Primary Examiner.*

M. S. GITTES, *Assistant Examiner.*